Dec. 18, 1951     M. H. MESNER     2,579,269
DELAY DEVICE
Filed March 31, 1948     2 SHEETS—SHEET 1

INVENTOR
Max H. Mesner
BY
ATTORNEY

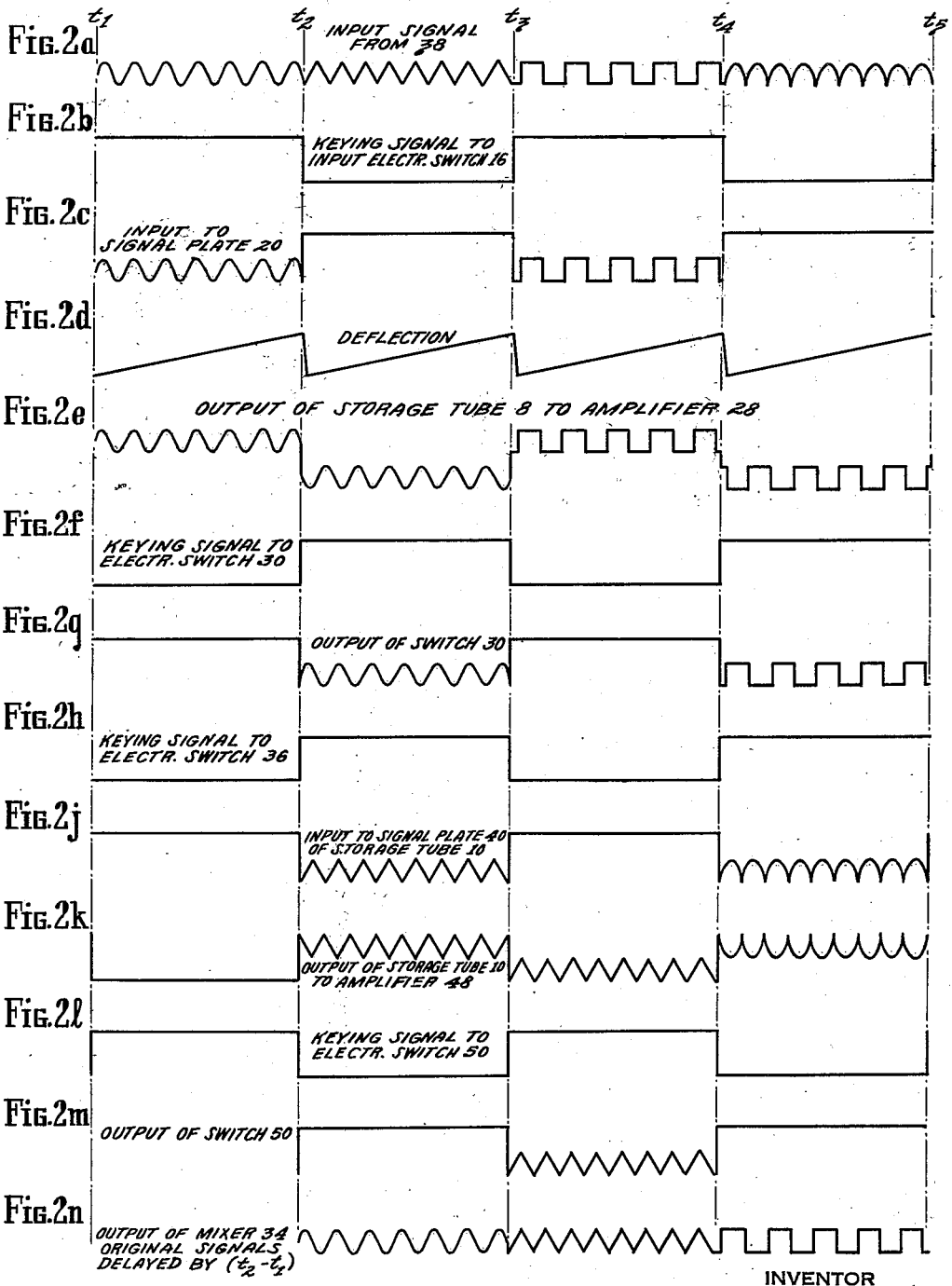

Patented Dec. 18, 1951

2,579,269

UNITED STATES PATENT OFFICE 2,579,269

DELAY DEVICE

Max H. Mesner, Princeton, N. J., assignor to Radio Corporation of America, a corporation of Delaware Application March 31, 1948, Serial No. 18,119

4 Claims. (Cl. 178—44)

This invention relates to apparatus for delaying a continuous signal or a complex wave. More specifically, the invention relates to a delay device which utilizes two single gun storage tubes.

In the past, delay networks have been used to delay signals for a desired period of time but suitable networks for delaying complex waves are very difficult to construct. Storage tubes have also been previously used for delaying repetitive phenomena, such as radar signals. Single tubes have been used in this type of apparatus but, obviously, a single tube apparatus cannot be used for delaying a continuous signal without losing half the signal. Apparatus using double gun tubes has also been tried but the operation of double gun tubes has not been entirely successful. In the present invention, however, there is provided a circuit in which two single gun storage tubes, such as those known as the R. C. A. SDT-5 or the "signal plate kinescope" may be used to obtain a delay of the signal, one delaying information received during the first half of an interval and the second delaying information received during the second half of the interval while the first half of the information is being reproduced.

One object of the invention is to provide an apparatus for delaying a signal which may have a complex wave form.

Another object of the invention is to provide an apparatus for delaying a continuous signal.

Another object of the invention is to provide an apparatus utilizing two single gun storage tubes for delaying a signal for a desired period of time.

Still another object of the invention is to provide an improved storage tube apparatus for delaying a continuous signal without omitting any of the signal.

These and other objects will be more apparent and the invention will be better understood from the following description, including the illustrative drawings, of which:

Figs. 2a to 2n are graphical illustrations of wave forms as they may appear at various points of the circuit of Fig. 1.

Figure 1:
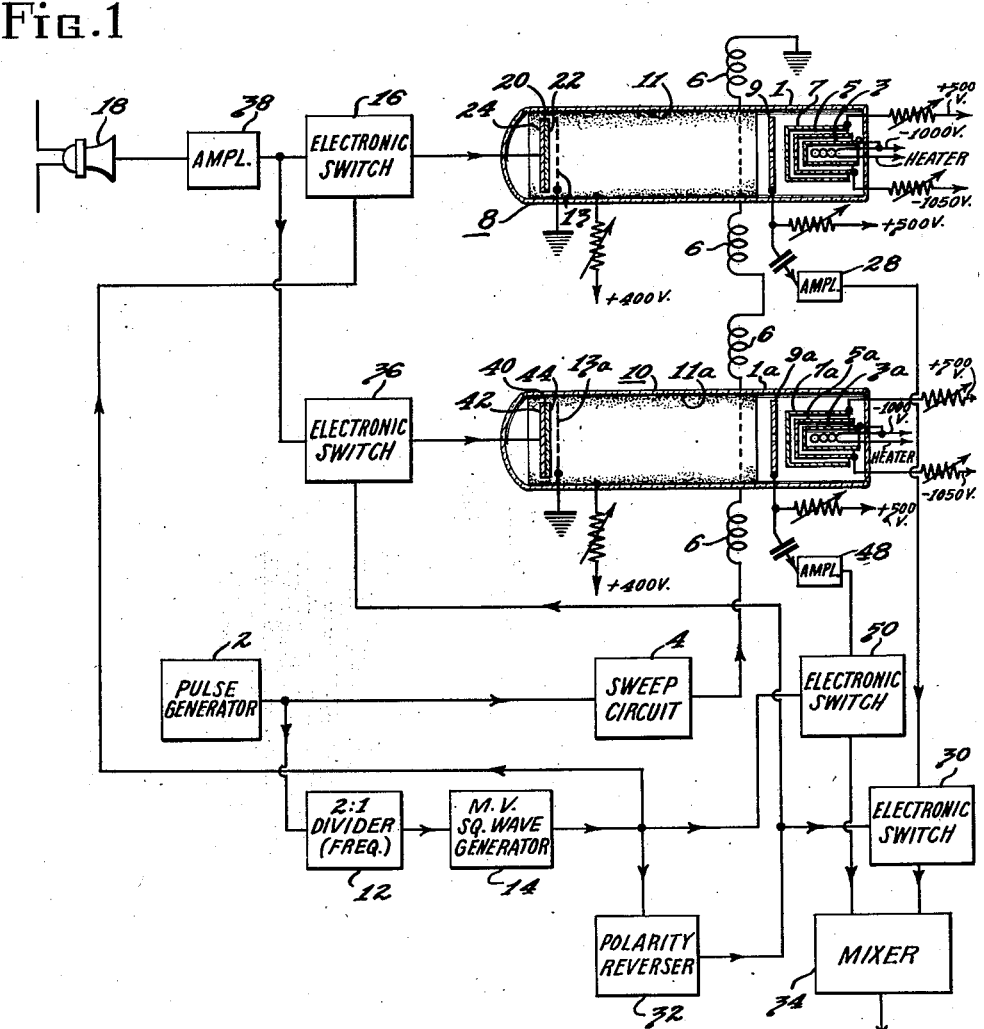
Fig. 1 is a block diagram of a preferred embodiment of the present invention.

Referring now to Fig. 1, a pulse generator 2, of conventional type such as described in the Radio Engineer's Handbook (Terman), McGraw-Hill Co., 1943, p. 514, is operated at a repetition rate such that the time between institution of successive pulses is equal to the delay period required. The pulses of output from the pulse generator are fed to a sweep circuit 4, which may be of conventional type. Each pulse initiates a sawtooth wave (see Fig. 2d) which is applied to the deflection coils 6 of two storage tubes 8 and 10. These storage tubes may be of the RCA type SDT-5, a description of which, together with the mode of operation, appeared in an article entitled "The barrier grid storage tube and its operation" by Smith, Mesner, Flory and Jensen, RCA Review, March, 1948, vol. 9, No. 1, or as described in U. S. Patent 2,433,941.

Each tube includes an evacuated envelope 1 or 1a containing a heated cathode 3 or 3a at one end of the tube. Surrounding the cathode are grids 5 or 5a and 7 or 7a, each of which contains an orifice for passage of the electrons supplied by the cathode. In front of the grid structure, there is positioned a disc shaped collecting electrode 9 or 9a also containing a central orifice for passage of electrons leaving the cathode. An accelerating anode 11 or 11a in the form of a metallic coating on the inner walls of the tube envelope is positioned in the part of the tube between the collecting electrode and signal plate. The signal plate 20 or 40 consists of two parts. The rear portion 24 or 42 may be a metallic plate, such as aluminum, connected to the signal source. The front portion 22 or 44 facing the source of electrons may be a dielectric coating such as aluminum oxide. Immediately in front of the coated face of the signal plate is a fine mesh screen 13 or 13a, which is grounded.

In general, the operation of this type of storage tube is as follows. The beam of electrons from the electron source passes through the fine mesh screen and strikes the dielectric target side of the signal plate at high velocity. Secondary electrons are emitted from the dielectric surface and, if the bombarded area is negative relative to the screen, pass through the screen towards the output or collector electrode. This causes the bombarded area of the target to become more positive, until the potential of the bombarded target area reaches that of the screen. If the bombarded area of the target is positive relative to the screen, the secondary emission from the area is suppressed by the negative field caused by the screen and the target element becomes more negative until it reaches screen potential. When no signal is being impressed on the signal plate from a signal source, during the period of scansion, scansion of the beam across the target thus brings the scanned areas to the potential of the screen. The beam is made to have sufficient intensity to substantially instantly bring the potential of an elemental area to the screen potential.

Part of the output from the pulse generator 2 is also led to a 2:1 ratio frequency divider 12, which may be of the well known "stair-step" counter type described in U. S. Patent 2,113,011 to E. L. C. White. Here, the frequency of the energy pulses from the pulsing generator 2 is reduced one-half and the pulses are used to synchronize a multivibrator 14, which produces a square wave output, as shown in Fig. 2b, in which the positive and negative portions are equal. The multivibrator may be of the type described in "Review of Scientific Instruments," October, 1946, page 404.

Part of the output of the multivibrator is fed to an electronic switch 16, which is preferably a pentode vacuum tube in which signal is applied to the control grid and the square wave is applied to the suppressor grid. The electronic switching tube and circuit may be of the type more particularly described in "Review of Scientific Instruments," October, 1946, page 396, in an article entitled "Precision circuit techniques" by Briton Chance.

A microphone 18, of any conventional type, may be used as the source of signal which may be illustrated as having a wave form such as shown in Fig. 2a. The electronic switch may be set such that the signal from time $t_1$ to $t_2$ (see Fig. 2c) is passed to the signal plate 20 of the storage tube 8. As the signal is being impressed on the signal plate, the dielectric target side of the plate is being scanned by the electron beam. As each elemental area is struck by the beam, it is brought to and left at a potential which is directly proportional to the voltage level of the modulating signal. Secondary electrons in an amount proportional to the potential of the signal plate at the instant are emitted from each elemental area as it is scanned. These electrons travel to the collecting electrode 9 and the signal being impressed on the signal plate thus is reproduced in the output of the tube. During the next time interval, $t_2$ to $t_3$, no signal is being placed on the signal plate 20 from the source 18. However, the signal which was stored on the plate during the period $t_1$ to $t_2$ is now taken off during this interval. This is done by again scanning the coated target side 22 of the signal plate. The period between successive scans is, of course, equal to the delay period required.

During this scansion, which takes off the signal, the number of secondary electrons leaving each elemental area will be proportional to the potential at which the area was left by the previous scansion. The secondary electrons travel to the collecting electrode 9 as previously explained and each elemental area of the target is returned to the potential of the screen in readiness for the next period when signal will again be applied to the signal plate.

The output electrode 9 of the storage tube will have a wave pattern, such as shown in Fig. 2e; that is, the undelayed signal followed by its delayed replica. The output of the electrode 9 is amplified by a conventional amplifier 28 and then fed to an output electronic switch 30. The output electronic switch 30, which is of the same type as the switch 16, is controlled by means of part of the square wave output of the multivibrator 14, which has first been fed to a polarity reversing tube 32 such that its polarity has been reversed, as shown in Fig. 2f. This switch 30 then selects that part of the output from amplifier 28, occurring between times $t_2$ and $t_3$, cutting off that part occurring from $t_1$ to $t_2$ (see Fig. 2g). The part which is not cut off is then fed to a mixer 34, the output wave form of which is shown in Fig. 2n. In Fig. 2n, it will be seen that the part of the signal of Fig. 2a which occurred during the period $t_1$ to $t_2$ appears in the output as occurring during the period $t_2$ to $t_3$, etc. Each portion of the signal is delayed for one period.

Figure 3:
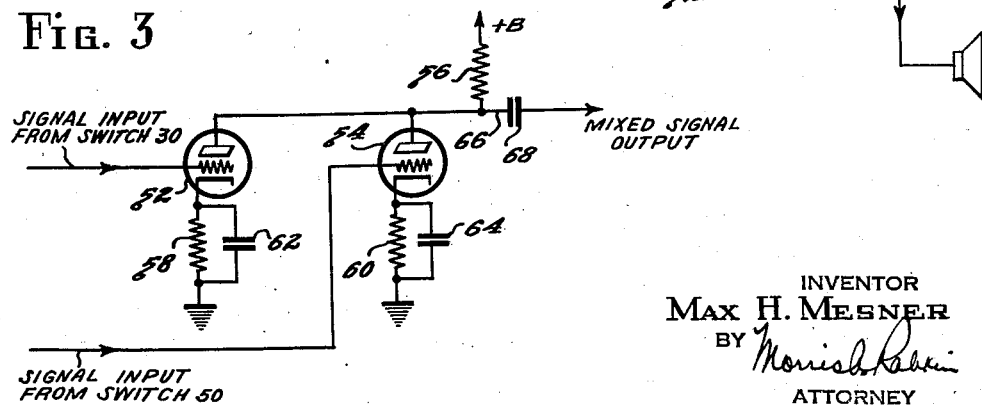
Fig. 3 is a schematic diagram of a mixing circuit which may be used in the present invention and which is indicated in block in Fig. 1.

The mixing circuit is also of conventional type and may be of the type illustrated in Fig. 3. It will be explained in more detail later.

By a process similar to that previously described, another electronic switch 36 also receives part of the signal output from microphone 18 as amplified by the amplifier 38 and by means of part of the square wave output of multivibrator 14, which has been reversed in polarity, is shown in Fig. 2h, selects that part of the signal occurring during the period $t_2$ to $t_3$, as well as every succeeding alternate period; i. e., $t_4$ to $t_5$, etc., and supplies it to the signal plate 40 of the second storage tube 10, as shown in Fig. 2j. This signal plate has a metal electrode 42 and a dielectric coated side 44. Here, the signal is first stored and then is scanned by the electron beam of the storage tube 10, by means of which it is made to appear on the output electrode 9a of the tube, from whence it is fed to the output amplifier 48 (see Fig. 2k) and then to the electronic switch 50. As before, at this point, the signal appears followed by its delay replica. The electronic switch 50 is controled by part of the output of the multivibrator 14 (see Fig. 2l) such that it passes only that part of the output of the second storage tube 10 occurring during the period $t_3$ to $t_4$ and every succeeding alternate period such as $t_5$—$t_6$, etc., (see Fig. 2m).

The output passed by the electronic switches 30 and 50 is combined in the mixer 34 to produce a substantially continuous output pattern such as shown in Fig. 2n.

A suitable mixing circuit, indicated generally at 34, is shown schematicaly in Fig. 3. This circuit comprises two triodes 52 and 54 having a common B+ supply connected through a common load resistor 56 to the anodes which are connected together in parallel. Both tubes have grounded cathodes and each tube has a cathode biassing resistor 58 and 60 and a by-pass capacitor 62 and 64, respectively.

The part of the output signal from the storage tube 8, which is passed by the electronic switch 30, is applied to the grid of tube 52, while the part of the output from the second storage tube 10, which is passed by the electronic switch 50, is applied to the grid of tube 54. Outputs of both tubes 52 and 54 are combined in the output circuit 66 which includes a blocking capacitor 68.

Each part of the pattern is delayed by the same time interval. This time interval is equal to the length of any of the periods $t_1$ to $t_2$, $t_2$ to $t_3$, etc. The wave output of each of the storage tubes alternates in the final output pattern. Very short breaks appear in the final pattern due to the recurring intervals representing the return times of the sawtooth beam deflection produced by the deflection coils 6. Although not absolutely necessary, blanking could be furnished by conventional means to shut off the beam during each brief return stroke.

It should be understood that all of the electronic switches appearing in the circuit are of similar construction and operate in a similar manner. In each case, the square wave output of the multivibrator, which may, first, in some cases, have been reversed in polarity, is fed to the suppressor grid of the pentode vacuum tube while the signal is applied to the control grid.

It should also be apparent that obvious modifications may be made in various circuit components without departing from the spirit of the invention. Various forms of electronic switches may be used. The square wave multivibrator could be replaced by other means for providing a control wave.

There has thus been described an improved form of apparatus for delaying either a continuous or an intermittent signal, which apparatus includes means for dividing up an incoming signal into equal periods and applying signal portions occurring during alternate periods to each of two different storage tubes, means for storing each portion of the signal for a period equal to the length of signal portion into which the signal was originally divided and means for recombining the delayed portions to reproduce the original signal.

I claim as my invention:

1. Apparatus for delaying an input signal for a predetermined period of time before applying said signal to a utilization circuit comprising means for generating pulses of energy having a periodicity equal to said predetermined delay period, means responsive to said pulses for generating a square wave, each half cycle of which is equal in length to said delay period, means for applying spaced portions of said signal to a first storage tube and for applying other spaced portions which alternate with said first mentioned portions to a second storage tube, means responsive to the output wave of said square wave generating means for controlling said means for applying to said storage tubes said sets of signal portions, means included in each of said storage tubes for delaying each of said signal portions for a period equal to said predetermined delay period, and means for receiving and mixing each of said delayed sets of signal portions such that a substantially continuous output wave pattern of said input signal is obtained.

2. Apparatus according to claim 1 which includes means for reversing the polarity of that portion of the output wave of said square wave generator which is utilized for controlling the application of signal portions to said second storage tube.

3. Apparatus for delaying an input signal for a predetermined period of time before applying said signal to a utilization circuit comprising means for generating pulses of energy having a periodicity equal to said predetermined delay period, a square wave generator controlled by said pulses, each half cycle of which wave is equal in length to said delay period, means for selecting spaced portions of said signal and for applying said spaced portions to the signal electrode of a first storage tube, means for selecting other spaced portions of said signal which alternate with said first mentioned portions and for applying said alternating portions to the signal electrode of a second storage tube, means for utilizing part of the output of said square wave generator for controlling said means for selecting and applying said signal portions to said first storage tube, means for reversing the polarity of another part of the output of said square wave generator, means for utilizing said another part of the output of said square wave generator for controlling the means for selecting and applying said other spaced portions of said signal to the second storage tube, means included in each of said storage tubes for delaying each of said signal portions for said predetermined delay period, and means for receiving and mixing each of said delayed sets of signal portions such that a substantially continuous output wave pattern is obtained.

4. Apparatus according to claim 3 in which the output of each of said storage tubes comprises each originally selected signal portion followed by its delayed replica and in which means is included for selecting only said portions corresponding to said delayed replicas and for feeding said delayed replicas to said mixing means.

MAX H. MESNER.

REFERENCES CITED

The following references are of record in the file of this patent:

UNITED STATES PATENTS

| Number | Name | Date |
|---|---|---|
| 2,191,565 | Henroteau | Feb. 27, 1940 |